Jan. 11, 1955  R. D. MEYERS  2,699,523
LIQUID LEVEL MEASURING CAPACITOR
Filed June 28, 1951
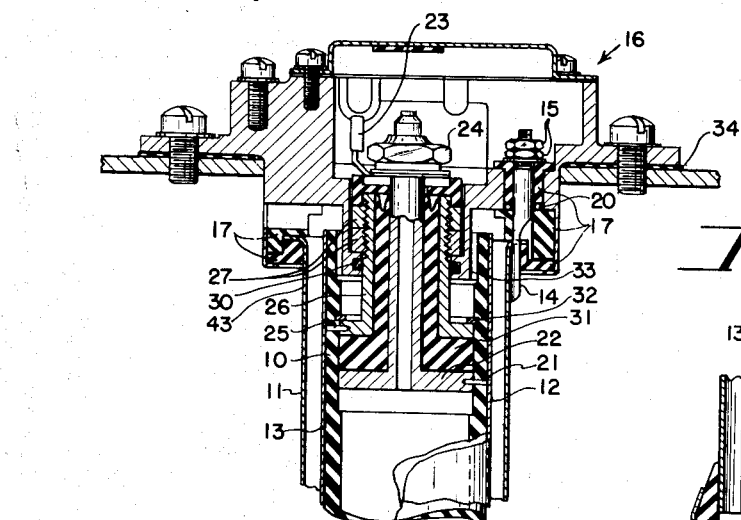
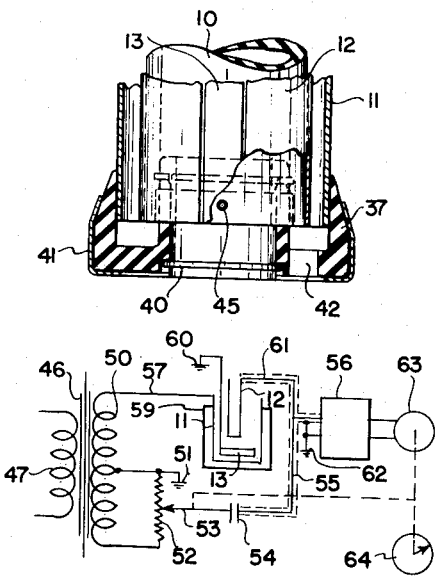
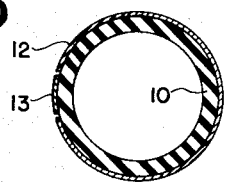
*INVENTOR.*
ROBERT D. MEYERS
BY
*ATTORNEY.*

United States Patent Office 2,699,523
Patented Jan. 11, 1955

2,699,523

LIQUID LEVEL MEASURING CAPACITOR

Robert D. Meyers, Minneapolis, Minn., assignor to Minneapolis-Honeywell Regulator Company, Minneapolis, Minn., a corporation of Delaware Application June 28, 1951, Serial No. 234,061

6 Claims. (Cl. 317—246)

This invention is concerned with the sensing element for measuring the quantity of fluid in a container and particularly with a capacitive type of sensing unit. It is therefore an object of this invention to design a new and improved sensing element or tank unit for measuring the quantity of fluid in a container.

This invention is particularly adapted for use with fuel measuring apparatus on aircraft. It is therefore another object of this invention to design an accurate lightweight tank unit.

A further object of the invention is to design a tank unit giving a fuel quantity indication which is not affected by foreign fluid in the bottom of the tank.

A further object of the invention is to design a tank unit giving a fuel quantity indication which is not affected by stray signals from other apparatus.

It is a further object of the invention to design apparatus for fuel measuring which is not affected by stray signals from other apparatus.

A further object of the invention is to design an improved tank unit of the type capable of deriving a signal which is linear in response to change in total quantity of fuel.

Briefly, the tank unit is designed with two concentric cylindrical members comprising the capacitor plates with a conductive member located near the bottoms of the plates so that any surface leakage path between the two plates must necessarily contain the conductive member. This conductive member is connected to a point of reference potential conveniently designated as ground potential. Thus, any indication due to surface leakage is by-passed out of the measuring circuit.

Also, the inner plate of the tank unit is electrically connected to the input circuit of an amplifier through a shielded lead while the outer plate of the tank unit is connected to a power source. As a result the plate connected to the grid of the first stage of the amplifier, as well as the lead making the connection, are shielded from stray frequencies or signals emanating from other nearby apparatus without requiring the use of an outer cylindrical shield.

For a further understanding of the invention reference is made to the following detailed description, taken in conjunction with the accompanying drawings, in which:

Figure 1 is a view, partly in section, of the tank unit mounted in a tank;

Figure 2 is a view, partly in section, from the left as it appears in Figure 1, of the bottom portion of the tank unit;

Figure 3 is a cross-sectional view of the inner electrode of the tank unit as it appears in Figure 1; and Figure 4 is a simplified circuit showing the manner in which the tank unit is connected into a measuring circuit.

Figure 1 shows the tank unit as having only two cylindrical members, an inner cylindrical member 10 and an outer cylindrical member 11. The inner cylindrical member is an insulative member on which is formed, either by plating or spraying or other satisfactory means, a conductive member 12 and a second conductive member 13. These conductive members 12 and 13 on the cylindrical member 10 can be better seen in Figures 2 and 3. As seen in Figure 3, gaps exist between conductive members 12 and 13. The conductive member 12 comprises a first plate of the capacitive tank unit with the outer cylindrical member 11 comprising the second plate of the capacitive tank unit.

Connection to the outer cylinder is made by means of pin 14 and nuts 15 to which a conductive lead is connected. The outer cylinder 11 is insulated from the conductive portions of the head 16 of the tank unit by means of insulative members 17. Pin 14 extends from outer cylinder 11 through openings in insulative members 17 to nuts 15 located in the head of the tank unit. These insulative members 17 also position the outer electrode with respect to the conductive head. An O-ring seal 20 prevents seepage of fuel out of the tank at this portion of the tank unit.

The inner capacitor plate 12 is connected by means of a pin 21 to the flange of a flanged conductive sleeve 22 to which connection is made by means of a terminal member 23 and nut 24. Sleeve 22 is hollow for weight reduction.

The conductive strip 13 is connected by means of a pin 25 to a conductive member 26 which makes contact with the conductive portion of the head 16 by means of nuts 27 and so is connected to ground. An O-ring seal 30 prevents seepage of fuel out of the tank along this path.

The two conductive members 22 and 26 are insulated from each other by insulator 31. The assembly comprising the conductive members 22 and 26 and insulative member 31 are held within the inner cylindrical member 10 by a snap ring 32 so as to relieve any strain on the pins 21 and 25. The nuts 27 hold the conductive member 26 rigidly with respect to the head 16 of the tank unit by bearing against an inwardly extending shoulder at the lower end of a cylindrical extension 33 of the conductive portion of the head. Nut 24 holds insulator 31 and conductive member 22 rigidly against conductive member 26 and thus against snap ring 32. As both the inner and the outer cylindrical members 10 and 11 respectively are held rigidly with respect to the head 16 of the tank unit it is obvious that they are rigidly positioned with respect to each other. An insulative gasket 34 prevents seepage of fuel out of the tank about the sides of the head of the tank unit. It is thus seen that a fluid tight seal is made at every possible path in and about the tank unit where fuel might otherwise seep out of the tank.

At the bottom of the tank unit the two cylindrical members 10 and 11 are held with respect to each other to prevent relative movement between the two members in the following manner. A conductive sleeve 35 is slid up inside the inner member 10 and is held in position by a snap ring 36. An insulative member 37 having two concentric upstanding flanges is then slid up onto the electrodes with the inner flange between the inner electrode and the conductive sleeve 35 and with the outer flange of the insulative member 37 snugly engaging the outside of the outer electrode with a snap ring 40 holding the insulative member 37 rigidly with respect to conductive member 35. An outer conductive member 41 is placed about the outside of the insulative member 37 for protection purposes to prevent damage due to a sharp blow. Drainage holes such as is shown by the numerals 42, in Figures 1 and 2, provide drainage of the fuel between the two cylindrical members. Similar drainage holes 43 are provided at the upper end of the tank unit and are placed in the side of the cylindrical member 11.

A conductive member 44 is positioned within the bottom end of the inner cylindrical member 10 and is connected to the conductive member 13 by means of a pin 45.

The conductive member 44 by being placed completely about the inner circumference of insulative member 10 forms a part of every possible surface leakage path between the inner capacitor plate 12 and the outer capacitor plate 11. By grounding this conductive member 44 through pin 45, conductive strip 13, pin 25, and conductive member 26, to the conductive portions of the head of the tank unit, which is electrically connected to the structure of the plane, the effect of any resistance due to surface leakage is removed from the measuring circuit of which the tank unit forms a part, as will be explained later.

Figure 4 shows a simplified circuit into which this tank unit may be connected. The tank unit is shown to be inserted in a tank 59. The measuring circuit is energized by means of a transformer 46 having a primary 47 and a secondary 50. The transformer secondary 50 is shown to be center tapped to a ground terminal 51 and has a potentiometer 52 with a wiper arm 53 connected across the lower half of the secondary. The wiper arm 53 is connected to one plate of a capacitor 54 the other plate of which is conected through a shielded conductor 55 to the input circuit of an amplifier 56.

The outer electrode 11 of the tank unit is connected to the upper terminal of the transformer secondary through a conductor 57. The conductive strip 13 is shown to be grounded to a ground terminal 60. The inner electrode 12 is connected through a shielded conductor 61 to the input circuit of the amplifier 56. Thus, the currents from the upper portion of the measuring circuit due to the voltage and the capacitance of the tank unit are compared with the voltage and the capacitance of the capacitor 54 in the input of amplifier 56. The other input terminal of the amplifier 56 is grounded at ground terminal 62. When the two signals from the upper and lower portions of the measuring circuit are equal the amplifier is not energized. When the signals are not equal the amplifier is energized and has an output signal which is sent to motor 63 to energize the motor and move the pointer on indicator 64 as well as to rebalance the measuring circuit by moving the wiper arm 53 along potentiometer 52 until the signal from the two portions of the measuring circuit are again equal, deenergizing amplifier 56.

The amplifier-motor combination 56 and 63 may be that shown in the Patent 2,423,534, assigned to the same assignee as the present invention.

By connecting the outer cylindrical member 11 to the transformer secondary and the inner electrode member 12 to the input of the amplifier 56 the outer cylindrical member 11 shields the inner member 12 from stray frequency waves due to other nearby electrical equipment. The shielding of the conductor 61 from the inner electrode 12 to the amplifier 56 and the shielding of the conductor 55 from the capacitor 54 to the amplifier 56 protects these conductors from stray frequency waves from nearby equipment. Normally capacitor 54 is positioned inside the amplifier container and so conductor 55 need not be shielded because its length is very short but if capacitor 54 should be positioned at a distance from the amplifier conductor 55 should be shielded. This is important in that the input signals to the amplifier are impressed upon the grid of the first electron tube in the amplifier and stray frequency waves may change the voltage on this grid which change the signal input to the input stage of the amplifier by an appreciable amount and thus render the entire circuit highly inaccurate. By connecting the inner electrode to the amplifier rather than the outer electrode to the amplifier it is possible to dispense with an outer cylindrical shield for the purpose of protecting the electrode connected to the amplifier.

By placing a grounded conductive strip in the surface leakage path between the inner and outer electrodes of the tank unit the resistance due to the surface leakage path between the two electrodes, which otherwise would be impressed into the measuring circuit and thus introduce an error is now bypassed to ground and so is removed from the measuring circuit. This is because the leakage resistance, instead of being across the capacitance of the tank unit is in effect divided into two separate resistances. One of the resistances is between the outer electrode and ground and so is across the upper portion of transformer 50, as seen in Figure 4, and so is out of the measuring circuit. The other resistance is between the inner electrode and ground and so is in parallel with the input circuit to amplifier 56 and so is also out of the measuring circuit.

It is thus seen that by the novel design of placing a conductive member in the surface leakage path between the two electrodes at the bottom ends thereof and by connecting this conductive strip to ground potential and by connecting the inner electrode, rather than the outer electrode, to the input circuit of an amplifier a three wire system has been made possible by using only two cylindrical members in the tank unit.

The inner capacitor plate 12 and grounded strip 13 may be characterized with respect to the shape of the tank and claimed in the manner described in an application by the same inventor having a Serial Number 192,685, filed October 28, 1950, and assigned to the same assignee as the present invention, in order that the change in capacitance of the tank unit with change in fuel quantity in a nonuniform tank may be linear.

Because modifications may be made by those skilled in the art upon a study of this specification and the drawings it is intended that the scope of the invention be defined and limited only by the extent of the appended claims.

I claim as my invention:

1. A capacitor for insertion into an opening in the top of a container of dielectric fluid comprising in combination: a first cylindrical conductive member comprising a first plate of the capacitor; a first partially cylindrical conductive member within said first cylindrical member and comprising the second plate of the capacitor; a second partially cylindrical conductive member spaced from said first partially cylindrical member and insulated from said first partially cylindrical member and so positioned with respect to said first partially cylindrical member that said first and second partially cylindrical members form a second cylindrical member within said first cylindrical member; a conductive ring connected to said second partially cylindrical member at the lower end thereof; and an insulator at the lower ends of said cylindrical members and providing surface leakage paths between the plates of the capacitor which include said conductive ring.

2. A tank unit for liquid fuel measuring equipment comprising in combination: an electrically conductive support member for fluid tight insertion through the top of a container of fuel; a first cylindrical electrode supported by said member and insulated therefrom; a second partially cylindrical electrode supported by said member within said first electrode and insulated from said member; a third partially cylindrical electrode supported by said member within said first electrode and electrically connected to said member, said third electrode being spaced from said second electrode and so positioned with respect to said second electrode that said second and third electrodes form a cylinder; insulating means at the lower end of said electrodes positioning said electrodes with respect to each other and providing surface leakage paths between said first and third electrodes and between said second and third electrodes, said insulating means having apertures such as to admit fluid into the space between the electrodes to contact said electrodes and to replace air as the dielectric of a capacitor including said first and second electrodes; and means making electrical connections with said electrodes.

3. A capacitor for insertion into an opening in the top of a container of dielectric fluid comprising in combination: an electrically conducting support member for fluid tight insertion through the top of the container of fluid; a first cylindrical member comprising a first plate of the capacitor supported by said support member and insulated therefrom, a partially cylindrical member concentric with said first member and comprising the second plate of the capacitor supported by said support member and insulated therefrom; insulation means between said first and second cylindrical members at the lower ends thereof; and a cylindrical conductive member connected to said support member within said first cylindrical member and positioned at the ends of said concentric members remote from said support member such that a surface leakage path between said concentric members at their ends remote from said support member at all points includes a portion of said conductive member.

4. A capacitor for insertion into an opening in the top of a container of dielectric liquid which might contain a foreign liquid of higher conductivity and density to measure the capacitance of the dielectric liquid and comprising in combination: an electrically conductive support member adapted to sealingly close the opening; separate insulating means supported by said support member, a first cylindrical capacitor plate and a partially cylindrical capacitor plate within said first plate and concentric with said first plate supported by said insulating means; and a cylindrical conductive member within the lower ends of said first and second plates and connected to said support member by a partially cylindrical member insulated from said second plate and so spaced with respect to said second plate as to occupy a portion of the cylindrical arc not covered by said second plate, said cylindrical conductive member being so positioned that a surface leakage path between said plates and around the foreign liquid is provided which at all points includes a portion of said conductive member, said conductive member further being so positioned as to be in direct contact with the dielectric liquid.

5. A capacitor for insertion into an opening in the top of a container of dielectric fluid comprising in combination: an electrically conductive support member, a first elongated tube-like conductive member comprising a first plate of the capacitor supported at the upper end thereof by said support member and insulated therefrom; a second elongated conductive member within said first member and comprising a second plate of the capacitor supported at the upper end thereof by said support member and insulated therefrom; a third conductive member within said first member at the lower end of said first member and spaced from said first and second members; insulation means between said first and second members at the lower ends thereof providing surface leakage paths between the plates of the capacitor which include said third member; and electrical connecting means within the confines of said first member connecting said third member to said support member.

6. A capacitor for insertion into an opening in the top of a container of dielectric fluid comprising in combination: a conductive support member, a first cylindrical conductive member supported at the upper end thereof by said support member but insulated therefrom and comprising a first plate of the capacitor; a second cylindrical conductive member within said first member supported at the upper end thereof by said support member but insulated therefrom and comprising the second plate of the capacitor; a third cylindrical conductive member within said first member at the lower end of said first member and spaced from said first and second members and insulated therefrom; insulation means between said cylindrical members at the lower ends thereof providing surface leakage paths between the plates of the capacitor which includes said third member; and electrical connecting means within the confines of said first member connecting said third member to said support member.

References Cited in the file of this patent

UNITED STATES PATENTS

| | | |
|---|---|---|
| 2,423,534 | Upton | July 8, 1947 |
| 2,544,012 | Edelman | Mar. 6, 1951 |
| 2,563,280 | Schafer | Aug. 7, 1951 |
| 2,563,281 | Griffith | Aug. 7, 1951 |
| 2,582,399 | Smith | Jan. 15, 1952 |